(12) United States Patent
Bagchi et al.

(10) Patent No.: US 8,560,291 B2
(45) Date of Patent: Oct. 15, 2013

(54) DATA CENTER PHYSICAL INFRASTRUCTURE THRESHOLD ANALYSIS

(75) Inventors: Sugato Bagchi, White Plains, NY (US); Soumyadip Ghosh, Peakskill, NY (US); Stacey Ramos, Cedar Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/820,845

(22) Filed: Jun. 22, 2010

(65) Prior Publication Data

US 2011/0313727 A1 Dec. 22, 2011

(51) Int. Cl.
G06F 17/50 (2006.01)
G06F 1/00 (2006.01)
G06G 7/54 (2006.01)

(52) U.S. Cl.
USPC .............................. 703/13; 703/18; 713/340

(58) Field of Classification Search
USPC ....................... 703/13, 18; 713/340
See application file for complete search history.

(56) References Cited

U.S. PATENT DOCUMENTS

2007/0198383 A1 8/2007 Dow et al.
2011/0016342 A1* 1/2011 Rowan et al. ................. 713/340

OTHER PUBLICATIONS

Jeonghwan Choi, Non Patent Publication, "Profiling, Prediction, and Capping of Power Consumption in Consolidated Environments", Sep. 2008.*
Troy Magennis, Non Patent Publication, "Improving Software Estimation Using Monte Carlo Simulation", Jul. 2008.*
Sriram Govindan, NPL, "Statistical Profiling based Techniques for Effective Power Provisioning in Data Centers", Apr. 2009.*
Sriram Govindan, NPL, "Statistical Profiling-based Techniques for Effective Power Provisioning in Data centers", Apr. 3-9, 2009.*
The Vanguard Software Corporation "The Vanguard System for Business Intelligence" 2006 (7 pages).

* cited by examiner

*Primary Examiner* — Omar Fernandez Rivas
*Assistant Examiner* — Angel Calle
(74) *Attorney, Agent, or Firm* — Mark Vallone, Esq.; George S. Blaslak, Esq.; Heslin Rothenberg Farley & Mesiti P.C.

(57) ABSTRACT

Analyzing one or more physical infrastructure elements of a data center by generating a plurality of outputs from a stochastic process for a set of inputs to the stochastic process. The inputs comprise one or more inputs of certainty and one or more inputs of uncertainty. A statistical output analysis of the outputs is utilized to generate one or more threshold reaching projections for each of the physical infrastructure elements of the data center.

22 Claims, 11 Drawing Sheets

DATA CENTER PHYSICAL INFRASTRUCTURE THRESHOLD ANALYSIS

BACKGROUND

The present invention relates to data center analysis, and more specifically, to data center physical infrastructure threshold analysis.

A data center is a facility used for housing computer and communications equipment. A business may maintain this equipment for the purpose of handling the data necessary for its operations. The computers housed in a data center include servers and storage units. The servers are typically mounted on server racks that are arranged in single rows forming corridors between them. Each server rack has an associated rack density, or number of servers that can be stored on the rack. The racks are supported by a raised floor, which is comprised of a gridded metal framework or understructure of adjustable-height legs that provide support for individual floor panels. Cables, wiring, electrical supplies, and various cooling components can be run underneath the floor panels of the raised floor.

The raised floor is considered an element of the physical infrastructure of a data center. Other physical infrastructure elements of a data center include layout efficiency, utility power, uninterruptible power supplies (UPS), generators, chillers, computer room air conditioners (CRAC), and power density. Layout efficiency refers to the percentage of total data center space that can be utilized based on how well the data center is organized. A one hundred percent layout efficiency denotes maximum space utilization in the data center.

Utility power is the electrical power delivered to the data center. The servers and storage units, among other electrical devices, utilize this power. In the event of a power outage, UPS systems can keep servers running on battery power for a period of time, thereby allowing for a clean shutdown without loss of data. Also in the event of a power outage, generators, which are devices that convert mechanical energy into electrical energy, can serve to provide electrical power to the servers.

Chillers and CRACs are elements of a data center's cooling infrastructure. A chiller produces chilled water via a refrigeration process for delivery to a computer room air handler (CRAH). Both CRAHs and CRACs move air throughout the data center over a fan system that delivers cool air to the servers and returns exhaust air from the data center. By definition, a CRAC is a refrigerant-based air conditioner installed under the raised floor and connected to outside condensing units. Power density refers to the maximum heat density that can be handled by data center cooling technology, such as chillers and CRACs, and can be measured in watts per square foot or watts per square meter.

The raised floor, UPS, utility power, generator, chiller, and CRAC physical infrastructure elements each have a threshold capacity, also referred to as a nameplate value. Less than one hundred percent of the threshold capacity of these elements may be usable. For example, less than one hundred percent of the threshold capacity of the raised floor may be usable, as corridors may need to be present between server racks.

SUMMARY

The present invention is directed to analyzing one or more physical infrastructure elements of a data center. In one aspect, an embodiment of the present invention comprises generating a plurality of outputs from a stochastic process for a set of inputs to the model, the inputs comprising one or more inputs of certainty and one or more inputs of uncertainty; performing a statistical output analysis of the outputs; and utilizing the statistical output analysis to generate one or more threshold reaching projections for each of the physical infrastructure elements of the data center. Embodiments of this aspect and other aspects of the present invention may be provided as methods, systems, and/or computer program products.

DETAILED DESCRIPTION

Figure 1:
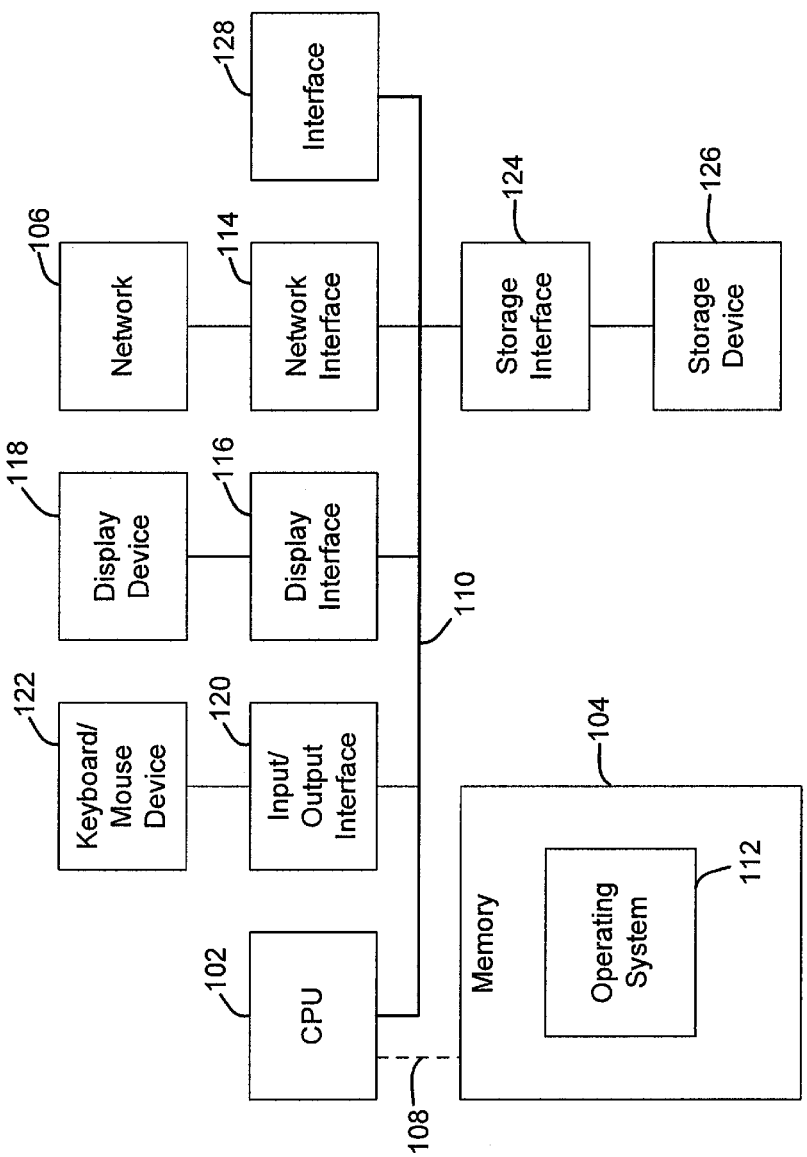
FIG. 1 is a hardware overview of a computer system according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (ram), a read-only memory (rom), an erasable programmable read-only memory (eprom or flash memory), a portable compact disc read-only memory (cd-rom), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term "computer readable storage medium" does not encompass a signal propagation medium such as a copper cable, optical fiber or a wireless transmission medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are directed to analyzing one or more physical infrastructure elements of a data center. The analysis can generate one or more threshold reaching projections for each physical infrastructure element of the data center, e.g., a projection of a point in time at which a physical infrastructure element may be used at its threshold capacity. As a business can make a significant financial commitment to its data center physical infrastructure, the projections are beneficial in that they can assist the business in correctly sizing a planned data center from the outset so that it lasts for several generations of server technologies. The projections are further beneficial in that they can assist the business in estimating the longevity of planned or existing physical infrastructure elements and the impact of data center consolidations, server rack density, and virtualization on the estimated longevity. Virtualization refers to partitioning a physical server into multiple "virtual" servers, thereby giving each "virtual" server the appearance and capability that it is running on its own dedicated machine. If the analysis is performed on an existing data center, the business can make plans to arrange for its future data center needs well in advance of reaching the projected end of the longevity of the data center physical infrastructure.

The inventors have found that typically, data center analyses are formulated as linear estimates based on past infrastructure growth experience. These analyses can be based on a deterministic model that does not account for uncertainties pertaining to the data center, such as the growth of the business needs that drive the consumption of computing infrastructure in the data center and the improvements in technology that can determine space and power requirements of the data center infrastructure. The inventors know of no solution whereby a data center analysis accounts for such uncertainties. An analysis that accounts for such uncertainties is beneficial in that it shows owners and designers of data centers what the impact of the uncertainty will be on the eventual usage of physical infrastructure elements of the data center, thus leading to better planning for how to provision physical infrastructure capacity in the future. Embodiments of the present invention address this issue.

Referring now to FIG. 1, a simplified block diagram of a data center physical infrastructure analysis system 100 suitable for implementing embodiments of the present invention is shown. System 100 is a computer system that can be a workstation, server, mainframe computer, notebook or laptop computer, desktop computer, mobile phone, wireless device, set-top box, or the like. Other possibilities for system 100 are possible, including a computer having capabilities other than those ascribed herein and possibly beyond those capabilities.

In the depicted embodiment, system 100 has central processing unit (CPU) 102, which is a programmable processor for executing programmed instructions stored in memory 104. CPU 102 can be a reduced instruction set (RISC) microprocessor such as a PowerPC® processor from IBM® Corporation, an x86 compatible processor such as a Pentium® processor from Intel® Corporation, an Athlon® processor from Advanced Micro Devices®, or any other suitable processor. In other embodiments, CPU 102 may comprise one or more processors distributed across one or more locations, e.g., on a client and server.

CPU 102 is connected to memory 104 either through a dedicated system bus 108 and/or a general system bus 110. Memory 104 can be a random access semiconductor memory for storing application data for processing such as that in a database partition. Memory 104 is depicted conceptually as a single monolithic entity. However, in other embodiments, memory 104 can also be arranged in a hierarchy of caches and in other memory devices, in a single physical location, or distributed across a plurality of physical systems in various forms. Memory 104 can include hard disk, tape, or other storage media. FIG. 1 illustrates that operating system 112 may be stored in memory 104. Memory 104 can also serve as a store for a physical infrastructure threshold analyzer, which is described in greater detail below. It is appreciated that embodiments of the present invention can be implemented in a distributed computing environment having a plurality of computers communicating via a suitable network 106.

Operating system 112 provides functions such as device interface management, memory management, and multiple task management. Operating system 112 can be a Unix based operating system such as the AIX® operating system from IBM®, a non-Unix based operating system such as the Windows® family of operating systems from Microsoft®, a network operating system such as JavaOS® from Sun Microsystems®, or any other suitable operating system. CPU 102 can be suitably programmed to read, load, and execute instructions of operating system 112. CPU 102 can also be suitably programmed to read, load, and execute instructions of a physical infrastructure threshold analyzer, as described in greater detail below. Other programs (not shown) can include server software applications in which network interface 114 interacts with the server software application to enable system 100 to function as a network server via network 106.

General system bus 110 supports transfer of data, commands, and other information between various subsystems of system 100. While shown in simplified form as a single bus, bus 110 can be structured as multiple buses arranged in hierarchical form. Display interface 116 supports video display device 118, which is a cathode-ray tube display or a display based upon other suitable display technology. The input/output interface 120 supports devices suited for input and output, such as keyboard or mouse device 122, and a disk drive unit (not shown). Storage interface 124 supports one or more storage devices 126, which could include a magnetic hard disk drive or CD-ROM, although other types of data storage devices can be used, including removable media.

Interface 128 is used for operationally connecting many types of peripheral computing devices to system 100 via bus 110, such as printers, bus adapters, and other computers. Network interface 114 provides a physical interface to a network 106, such as a local area network (LAN) or the Internet. Network interface 114 can be any type of adapter that provides an interface between system 100 and network 106, such as a modem that can be connected to a transmission system such as a telephone line, an Ethernet adapter, or a Token Ring adapter. System 100 can be connected to another network server via a LAN using an appropriate network protocol and the network server that can in turn be connected to the Internet.

Figure 2:
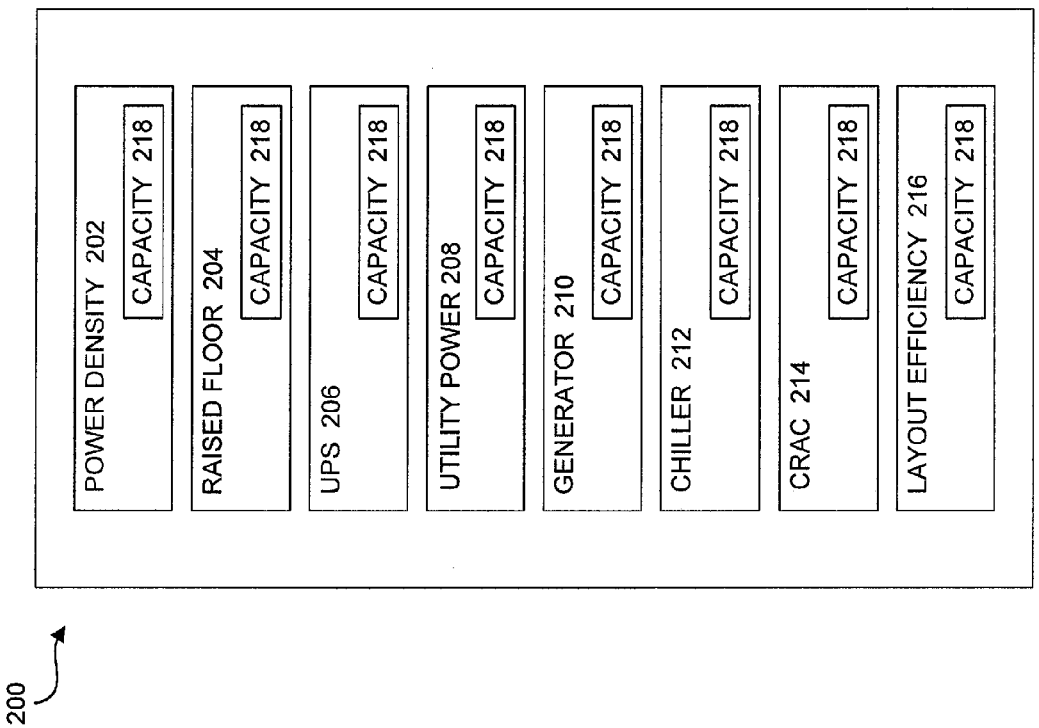
FIG. 2 is a listing of physical infrastructure elements of a data center according to an embodiment of the present invention.

Referring to FIG. 2, there is shown a simplified illustrative depiction of one or more physical infrastructure elements 200 of an existing or planned data center (not shown). Physical infrastructure elements 200 can comprise a power density 202, a raised floor 204, a UPS 206, a utility power 208, a generator 210, a chiller 212, a CRAC 214, and a layout efficiency 216. Each physical infrastructure element 200 can have a threshold capacity 218. Capacity 218 of power density 202 can be the maximum heat density that the data center's cooling infrastructure can handle and can be measured in watts per square feet or watts per square meter. Capacity 218 of raised floor 204 can comprise a nameplate value measured in square feet or square meters and a usable percentage of the nameplate value. Capacity 218 of UPS 206, utility power 208, and generator 210 can each comprise a nameplate value measured in kilovolt amperes (KVA) and a percentage of usable nameplate value. Capacity 218 of chiller 212 and CRAC 214 can each comprise a nameplate value measured in tons and a percentage of usable nameplate value. Capacity 218 of layout efficiency 216 can be a percentage of usable space based on the data center's organization, where one hundred percent (100%) denotes maximum space utilization.

Figure 3:
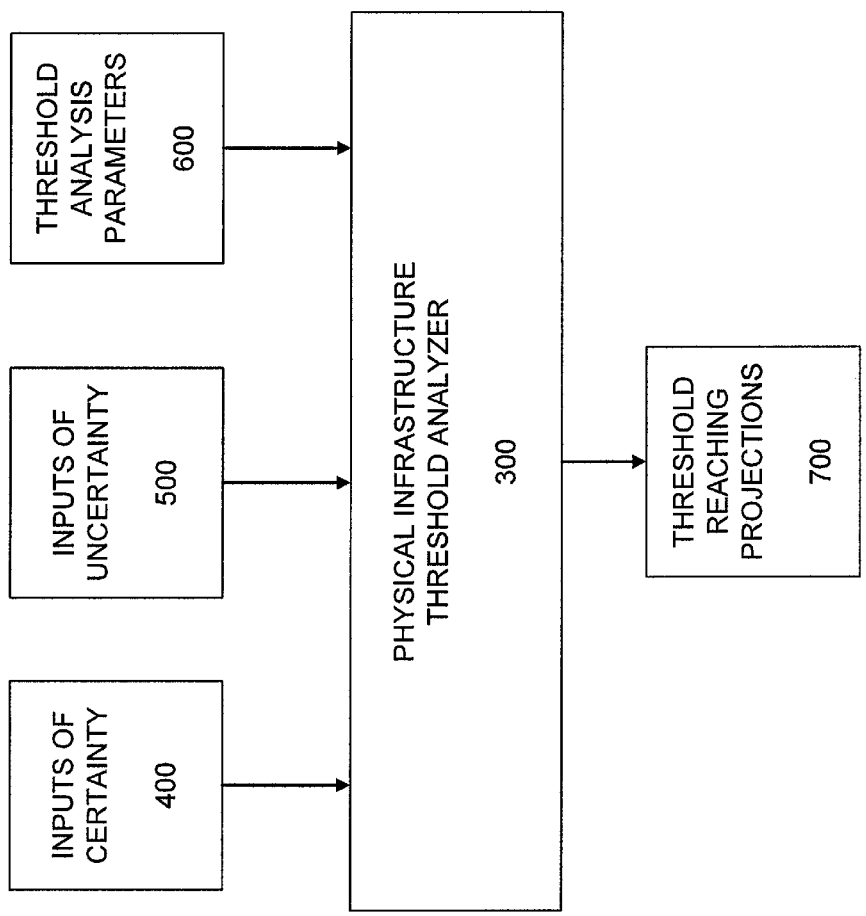
FIG. 3 is an illustration of physical infrastructure threshold analysis according to an embodiment of the present invention.

Referring to FIG. 3, there is shown a simplified illustrative depiction of data center physical infrastructure analysis according to an embodiment of the present invention. Physical infrastructure threshold analyzer 300 can be a software tool that can be implemented on system 100 to analyze physical infrastructure elements 200 of the data center. The set of inputs to analyzer 300 can be inputs of certainty 400, inputs of uncertainty 500, and threshold analysis parameters 600. Using this set of inputs, analyzer 300 can generate one or more threshold reaching projections 700 for each physical infrastructure element 200 of the data center.

Figure 4:
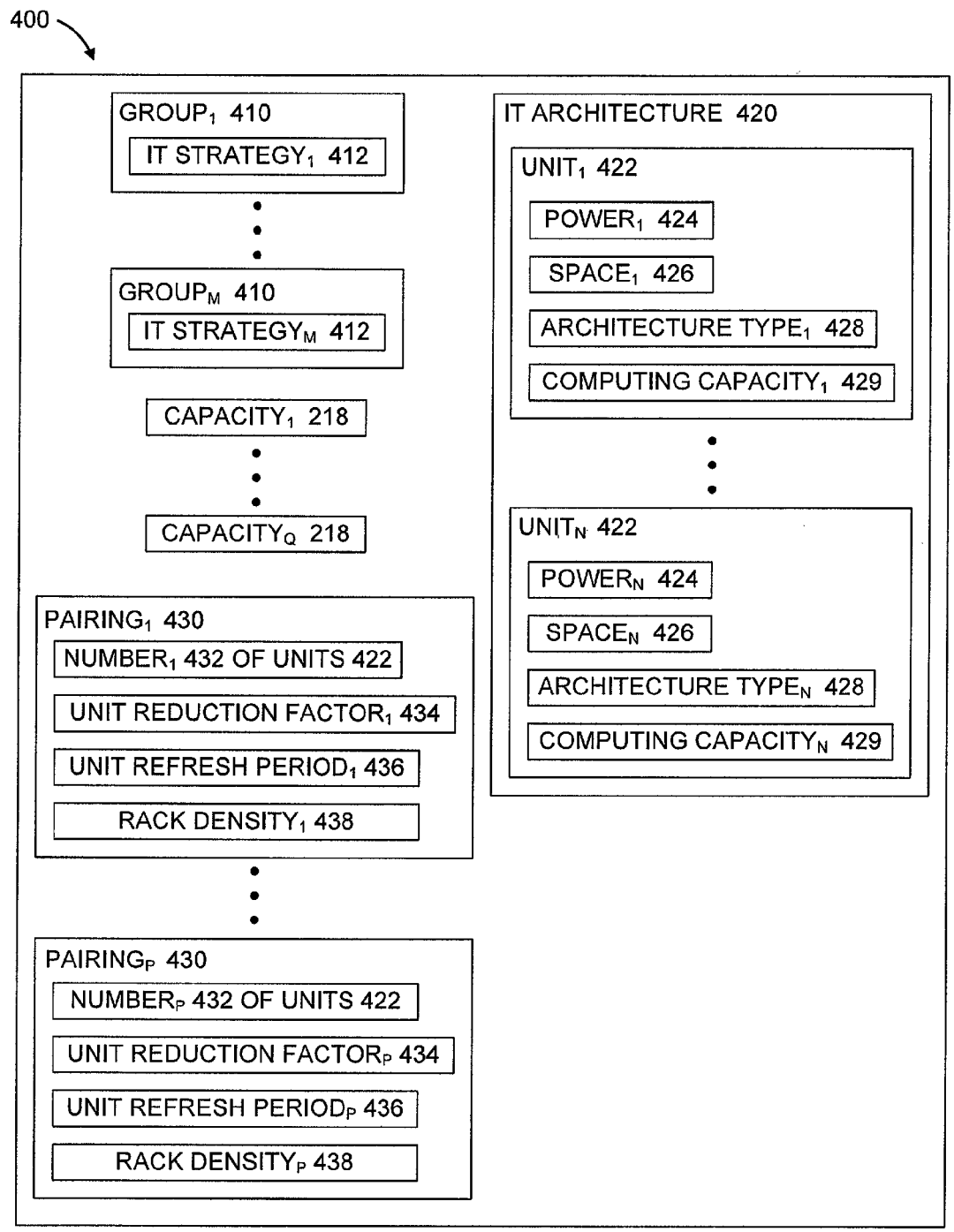
FIG. 4. is a listing of inputs of certainty according to an embodiment of the present invention.

FIG. 4 illustrates inputs of certainty 400 according to one embodiment of the present invention. Inputs of certainty 400 can comprise one or more groups 410 of IT applications that are associated with the data center, an IT architecture 420, one or more group-to-architecture type pairings 430, and the threshold capacity 218 of each physical infrastructure element 200. Each group 410 can be an application group or a subgroup. An application group can be a group of applications that collectively support a business function. For example, applications that support human resources-related functions can be represented by a group 410 that is an application group denoted as "Human Resources." A subgroup can be a group of applications that support a business function of an application group. For example, applications that support benefits-related functions of the "Human Resources" application group can be represented by group 410 that is a subgroup denoted as "Benefits." The presence of groups 410 in inputs of certainty 400 is beneficial in that one or more of threshold reaching projections 700 can be broken down according to each group 410. Each group 410 can have a corresponding IT strategy 412. For example, IT strategy 412 of the "Human Resources" group 410 can be to reduce consumption of capacity 218 of raised floor 204 over the next five years.

IT architecture 420 can define one or more units 422. Each unit 422 can be, for example, a server or a storage unit, can have an associated power 424, can take up space 426, can have an architecture type 428, and can have a computing capacity 429. Power 424 can be a value expressed in kilowatts (KW). Space 426 can be a value expressed in square feet or square meters. Examples of architecture type 428 include, but are not limited to, IBM® pSeries, Hewlett Packard® (HP) BL, HP RX, HP DL, HP ML, Cisco®, Sun Solaris®, and Dell® PowerEdge. Computing capacity 429 can be a value expressed in millions of instructions per second (MIPS).

Each group 410 can paired to each architecture type 428 of units 422 of IT architecture 420 to form one or more group-to-architecture type pairings 430. Each pairing 430 comprises a number 432 of units 422 of the architecture type 428 of the pairing 430 that the group 410 of the pairing 430 utilizes or will utilize on start year 606 shown in FIG. 6. For example, one of pairings 430 can show that "Human Resources" group 410 utilizes five units 422 having an "IBM® pSeries" architecture type 428 in start year 606. Each pairing 430 can further comprise a unit reduction factor 434, a unit refresh period 436, and a rack density 438. Unit reduction factor 434 can be a percentage reduction in the number 432 of units 422 due to planned virtualization or improved utilization over a time period 602 shown in FIG. 6. Unit refresh period 436 can be a period in which a portion of the number 432 of units 422 of pairing 430 that is at least as old as unit refresh period 436 is replaced with a new unit of equivalent compute capacity.

Figure 5:
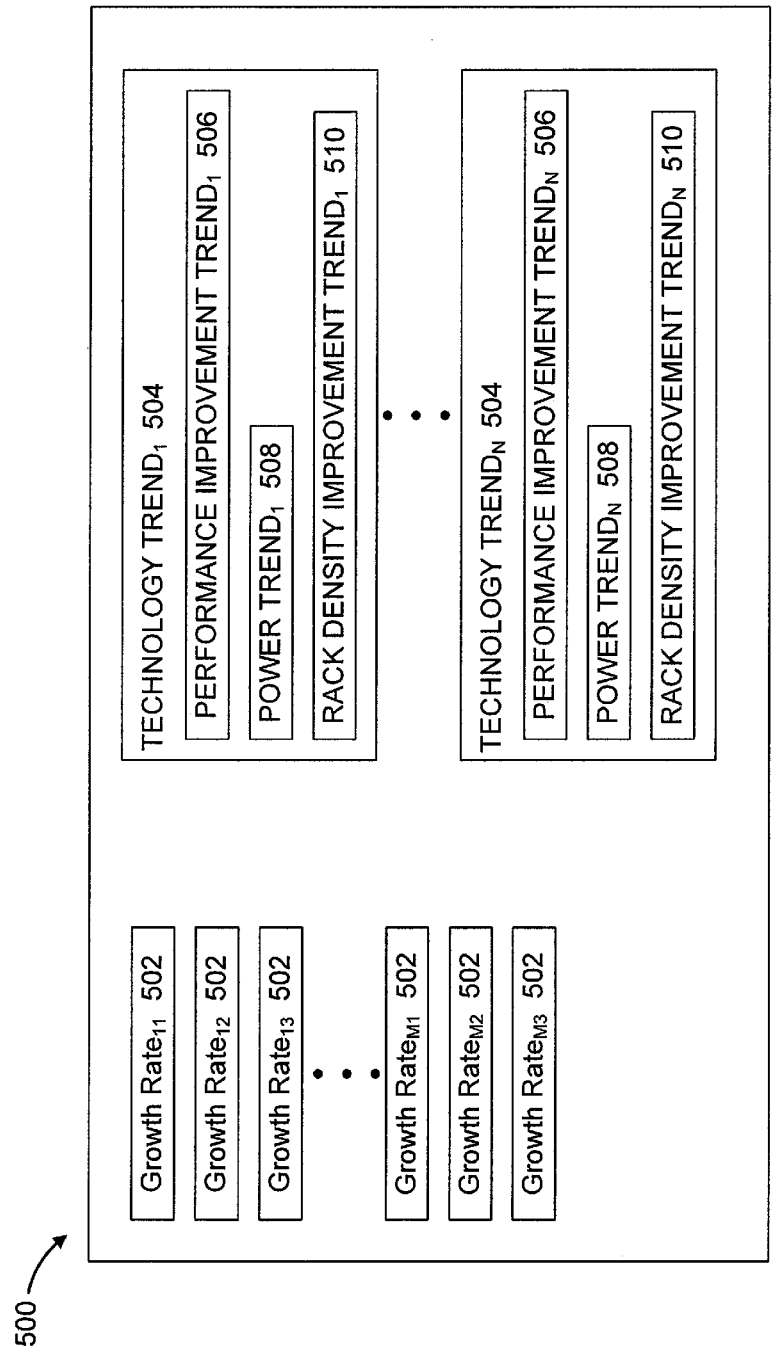
FIG. 5 is a listing of inputs of uncertainty according to an embodiment of the present invention.

FIG. 5 is an illustration of inputs of uncertainty 500 in an embodiment of the present invention. Inputs of uncertainty 500 can include one or more growth rates 502 for each group 410 and a technology trend 504 for each architecture type 428. In one embodiment, inputs of uncertainty 500 can include three growth rates 502, the first growth rate 502 representing an optimistic view of the corresponding group's 410 growth, the second growth rate 502 representing a pessimistic view of the corresponding group's 410 growth, and the third growth rate 502 representing a most-likely view that is between the optimistic view and the pessimistic view of the corresponding group's 410 growth. Each technology trend 504 can comprise a performance improvement trend 506, a power trend 508, and a rack density improvement trend 510. Performance improvement trend 506 can be an estimated annual improvement in computation speed of units 422 that are servers or in storage density of units 422 that are storage units. Power trend 508 can be an estimated annual increase in the electrical power requirement per unit 422. Rack density improvement trend 510 can be an estimated increase in the number of units 422 of the corresponding architecture type 428 that can fit on a server rack. Each technology trend 504 can be expressed as a fixed value or as an expected value and corresponding deviation therefrom.

Figure 6:
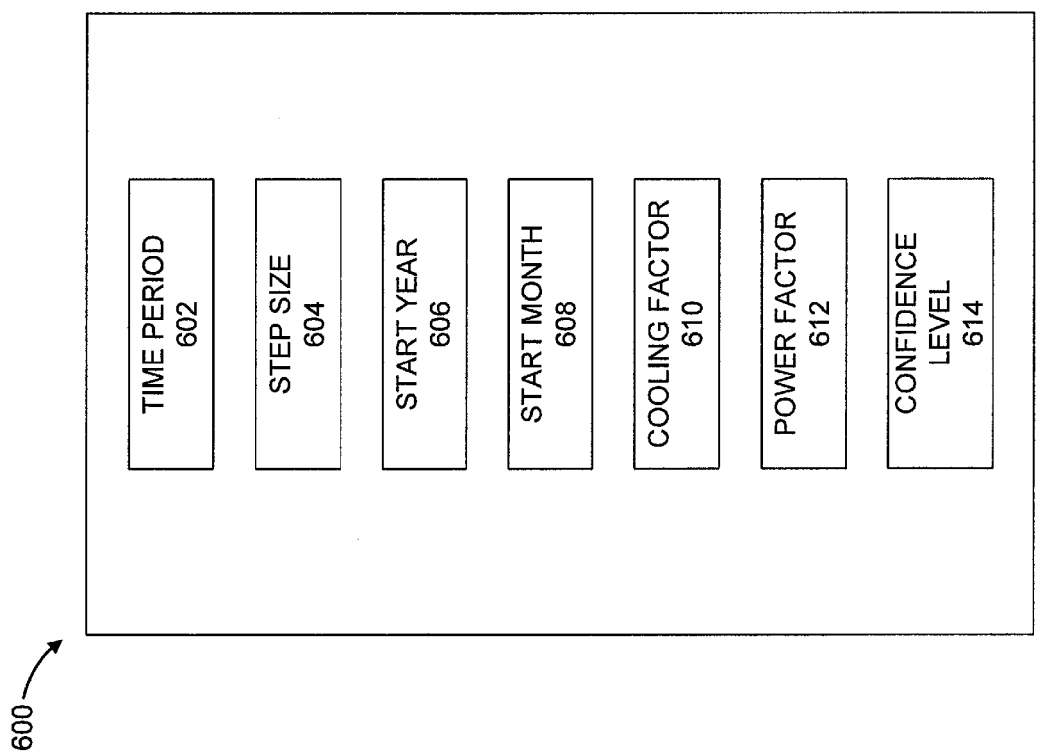
FIG. 6 is a listing of threshold analysis parameters according to an embodiment of the present invention.

FIG. 6 illustrates threshold analysis parameters 600 according to one embodiment of the present invention. Threshold analysis parameters 600 can include a time period 602, a step size 604, a start year 606, a start month 608, a cooling factor 610, a power factor 612, and a confidence level 614. Analyzer 300 can perform a data center physical infrastructure threshold analysis over time period 602, which can be measured in years, by step size 604 intervals that can be periods of months within time period 602, starting in start year 606 and start month 608. Time period 602, step size 604, start year 606, and start month 608 can all be numeric values. Cooling factor 610 can be a numeric value representing tons of cooling that is required for one kilowatt (1 KW) of heat generated in the data center. Power factor 612 can be a numeric value representing a power factor used to convert KVA to KW. Confidence level 614 can be a level of confidence in the accuracy of threshold reaching projections 700, which can be stochastic due to the uncertainty associated with inputs of uncertainty 500.

Figure 7:
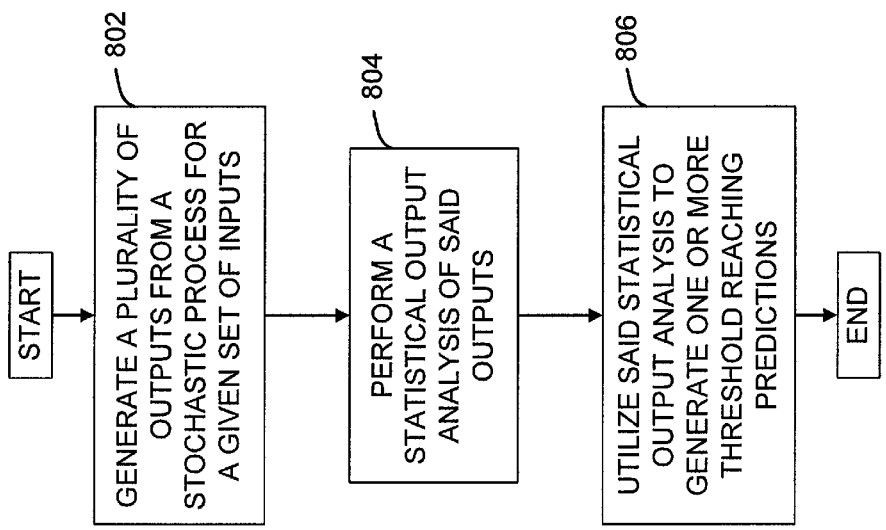
FIG. 7 is a flowchart for the process of analyzing one or more physical infrastructure elements according to an embodiment of the present invention.

FIG. 7 is a flowchart describing a method for analyzing physical infrastructure elements 200 of the data center according to an embodiment of the present invention. The method commences at block 802, wherein analyzer 300 generates a plurality of outputs from a stochastic process for a set of inputs. The stochastic process can be a Monte Carlo simulation. The set of inputs can comprise inputs of certainty 400 and inputs of uncertainty 500. In one embodiment, inputs of uncertainty 500 can be random variables and can have a probability distribution. In another embodiment, the set of inputs can further comprise threshold analysis parameters 600. The stochastic model can generate the plurality of outputs by performing a plurality of evaluations of a deterministic model. In one embodiment, for each evaluation, inputs of certainty 500 and one or more random numbers can be inputs into the deterministic model. The one or more random numbers can represent each input of uncertainty 500. Each random number can fall within the probability distribution of the associated input of uncertainty 500.

An example of a deterministic model according to one embodiment is now described. In this embodiment, inputs of certainty 400 comprise each pairing 430. Analyzer 300 can utilize this deterministic model to generate projections 700 including a raised floor projection 704 and a UPS power projection 706. The deterministic model can accept the following inputs, wherein the subscript "i" represents the $i^{th}$ evaluation being performed:

$n_t$—a quantity of units 422 of pairing, of pairings 430 acquired in time period t. $\bar{n}_t$ denotes the total number of units in this time period (consisting of servers acquired in this and previous periods), and is equal to number 432 of units 422 of pairing$_i$.

$m_t$—The compute capacity of the $n_t$ units acquired in time period t. The compute capacity can be measured in millions of instructions per second (MIPS). The total MIPS in this time period is $\bar{m}_t$, which is equal to the total computing capacity 429 of all units 422 of pairing$_i$.

$s_t$—The raised floor space consumption of the $n_t$ units acquired in time period t. The total space consumption in this time period is $\bar{s}_t$, which is equal to the total raised floor space 426 of all units 422 of pairing$_i$.

$w_t$—The power consumption of the $n_t$ units acquired in time period t. The total power consumption in this time period is $\bar{w}_t$, which is equal to the total consuming power 424 of all units 422 of pairing$_i$.

g—One of growth rates 502 of the group 410 of pairing$_i$. If more than one growth rate 502 is specified, g can be a random value from within a probability distribution associated with growth rates 502.

p—Power trend 508 of architecture type 428 of pairing$_i$, represented as a fraction of single-server power consumption for the year prior to start year 606. p can be a random value from within a probability distribution if power trend 508 is represented as an expected value with a corresponding deviation.

q—Performance improvement trend 506 of architecture type 428 of pairing$_i$, represented as a fraction of single-server performance for the year prior to start year 606. q can be a random value from within a probability distribution if performance improvement trend 508 is represented as an expected value with a corresponding deviation.

v—Unit reduction factor 434 for pairing$_i$, which can be represented as a fraction.

τ—Unit refresh period 436 for pairing$_i$. In time period t, any server t–τ periods and older will be replaced with a new server of equivalent compute capacity acquired in t.

The model assumes that pairing$_i$ has been operational for a number of years, such that in time period T, number of units 422 of pairing$_i$ acquired from period T–τ+1 to T are present in the data center.

The total number of units 422 of pairing$_i$ in time T is $$\bar{n}_T = \sum_{t=T-\tau+1}^{T} n_t$$

representing a total compute capacity of $$\bar{m}_T = \sum_{t=T-\tau+1}^{T} m_t$$

In the next time period T+1, new units will be acquired to (a) replace the $n_{T-\tau+1}$ servers providing $m_{T-\tau+1}$ of compute capacity and (b) support the additional compute requirement due to application growth, given by $g\bar{m}_t$. Thus, $$m_{T+1} = m_{T-\tau+1} + g\sum_{t=T-\tau+1}^{T} m_t$$

The model assumes that, in steady state, compute capacity for each time period follows a geometric progression given by $m_{t+1} = \gamma m_t$, such that:

$$m_{T+1} = m_{T-\tau+1} + gm_{T-\tau+1} \sum_{t=T-\tau+1}^{T} \gamma^{t-(T-\tau+1)}$$

$$= m_{T-\tau+1} + gm_{T-\tau+1} \frac{1-\gamma^\tau}{1-\gamma}$$

The following is derived using the relationship $m_{T+1} = \gamma^\tau m_{T-\tau+1}$:

$$\gamma^\tau = \frac{m_{T+1}}{m_{T-\tau+1}}$$

$$= 1 + g \frac{1-\gamma^\tau}{1-\gamma}$$

From this, the following is derived: $\gamma = 1+g$.

Therefore, $m_{t+1} = (1+g)m_t$.

Next, compute capacity $m_t$ is converted to number of units $n_t$ using the average compute performance per unit (given by growth rate of q between time periods).

$$n_{t+1} = \frac{1+g}{1+q} n_t$$

The number of units is further influenced by improved utilization due to virtualization. Utilization is assumed to be the same for all units in pairing$_i$. Let v be the fraction of the total unit count that can be eliminated in every time period due to improved utilization. This will be uniformly applied to units purchased in all time periods. (Note: the compute capacity requirement $m_t$ should not be affected by virtualization. It only impacts the number of units $n_i$ required to handle the capacity requirement.)

$$n_{t+1} = (1-v)\frac{1+g}{1+q} n_t$$

Let the above geometric multiplier for number of units be:

$$\lambda = (1-v)\frac{1+g}{1+q}$$

such that $n_{t+1} = \lambda n_t$.

The total number of units in time period T is given as follows:

$$\bar{n}_T = n_T + n_{T-1} + \ldots + n_{T-\tau+1}$$

$$= n_T(1 + \lambda^{-1} + \ldots + \lambda^{-\tau+1})$$

$$= n_T \left( \frac{1 - \lambda^{-\tau}}{1 - \lambda^{-1}} \right)$$

The following ratio is derived by applying the same formula to $\bar{n}_{T+1}$ and dividing by $\bar{n}_T$:

$$\frac{\bar{n}_{T+1}}{\bar{n}_T} = \frac{n_{T+1}}{n_T}$$

-continued $$= \lambda.$$

Thus, given the initial total number of units $\bar{n}_0$, the total number of units in future periods is estimated as a geometric progression with the multiplier $\lambda$. Note that the refresh period $\tau$ disappears from the equation. The impact of $\tau$ is factored in to the initial number of units $\bar{n}_0$ which contains units from previous periods. When $\tau$ is high, $\bar{n}_0$ will be high because it will contain older units.

Finally, the growth in total unit count is converted to growth in total raised floor space and UPS power requirements. Considering that the raised floor space per unit remains the same no matter which year it was acquired, the total raised floor space requirements grow as a geometric progression with the multiplier $\lambda$: $\bar{s}_{t+1} = \lambda \bar{s}_t$. Power per unit grows according to a geometric progression with multiplier $1+p$ where p is the power growth rate. Therefore, the total utility requirements will grow as a geometric progression with multiplier $\lambda(1+p)$: $\bar{w}_{t+1} = \lambda(1+p)\bar{w}_t$ Returning now to FIG. 7, a Microsoft® Excel® add-in such as Crystal Ball from Oracle® Corporation, @Risk from Palisade Corporation, Risk Solver from Frontline Systems, Inc., DFSS Master from Digital Computations, Inc., or Risk Analyzer from Add-ins.com, LLC can perform the stochastic process at block 802. At block 804, analyzer 300 performs a statistical output analysis of the outputs of the stochastic process. At block 806, analyzer 300 can utilize the statistical output analysis to generate threshold reaching projections 700 for physical infrastructure elements 200. In one embodiment, at block 806, analyzer 300 can further output projections 700 onto display device 118 of system 100.

Figure 8:
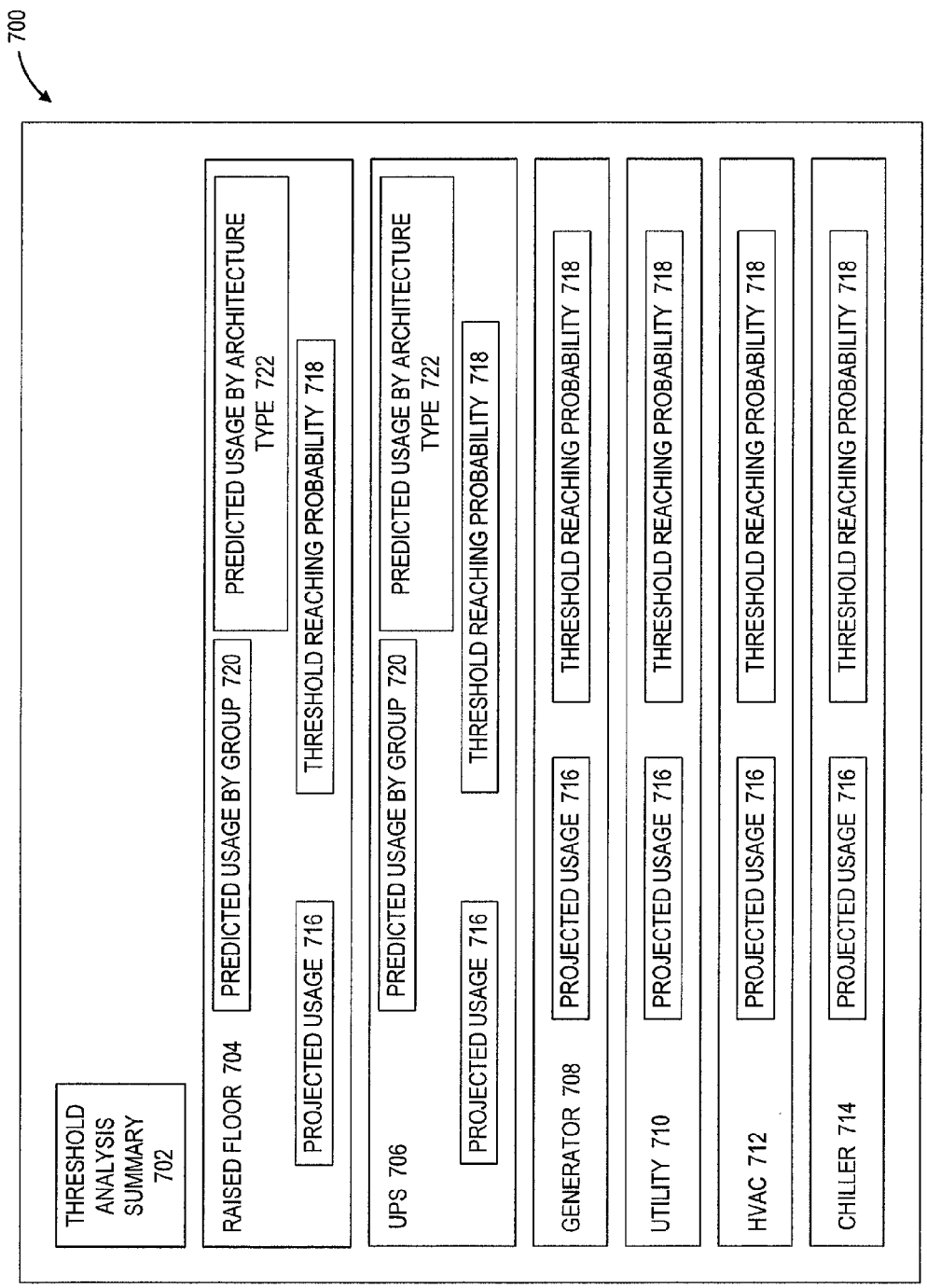
FIG. 8 is a listing of threshold reaching projections according to an embodiment of the present invention.

Analyzer 300 can generate projections 700 in addition to raised floor projection 704 and UPS power projection 706 described above. For example, FIG. 8 illustrates additional projections 700 that analyzer 300 can generate. The additional projections 700 can include a threshold analysis summary 702, a generator projection 708, a utility power projection 710, a heating, ventilating, and air conditioning (HVAC) projection 712, and a chiller projection 714. Threshold analysis summary 702 can be a projection of the utilized percentage of the capacity 218 of each physical infrastructure element 200 over time period 602. Each of raised floor projection 704, UPS projection 706, generator projection 708, utility projection 710, HVAC projection 712, and chiller projection 714 can comprise a predicted usage projection 716 and a threshold reaching probability projection 718.

Predicted usage projection 716 can indicate, for example, amounts of capacity 218 of raised floor 204 that the data center may utilize throughout time period 602. Threshold reaching probability projection 718 can indicate, for example, the probability that capacity 218 of raised floor 204 will be reached at any of a number of intervals equal to time period 602 divided by step size 604. Raised floor projection 704 and UPS projection 706 can further comprise a group predicted usage breakdown 720 and an architecture type predicted usage breakdown 722. Breakdown 720 can indicate, for example, the amount of capacity 218 of raised floor 204 that the "Human Resources" group 410 may utilize throughout time period 602. Breakdown 722 can indicate, for example, the amount of capacity 218 of raised floor 204 that units 422 of architecture type 428 of IBM® pSeries occupy throughout time period 602.

Figure 9A:
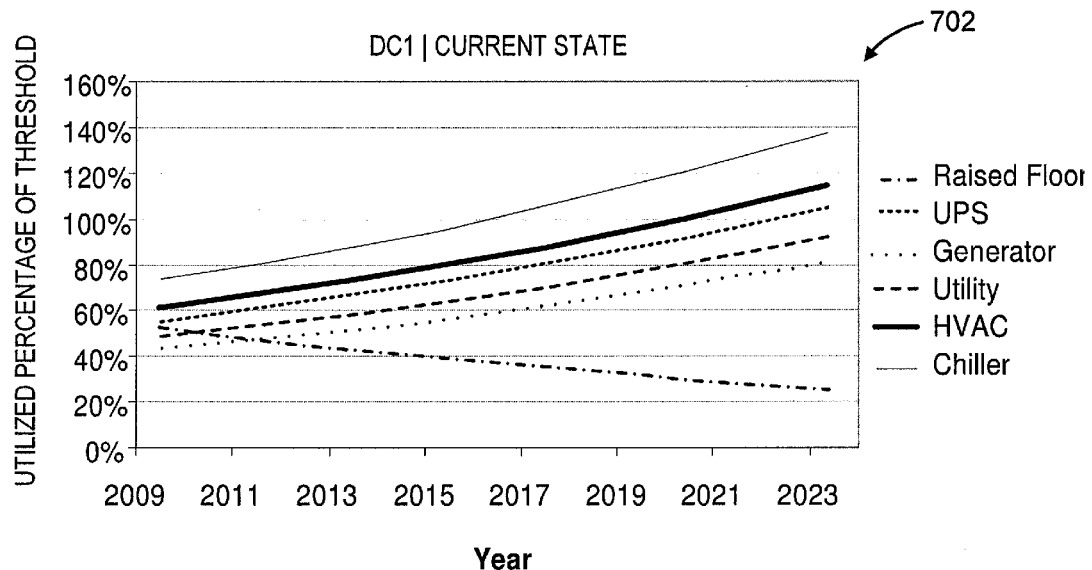
FIGS. 9a-9e are charts comprising threshold reaching projections according to an embodiment of the present invention.

FIGS. 9a-9e are exemplary projections 700 according to one embodiment of the present invention. FIG. 9a illustrates an exemplary threshold analysis summary 702 for a hypothetical data center named "DC1." In threshold analysis summary 702 shown in FIG. 9a, capacity 218 of chiller 212 of DC1 may reach one hundred percent in 2016, HVAC capacity, e.g., capacity 218 of CRAC 214, of DC1 may reach one hundred percent near the end of 2020, and capacity 218 of UPS 206 of DC1 may reach one hundred percent in mid 2022.

Figure 9B:
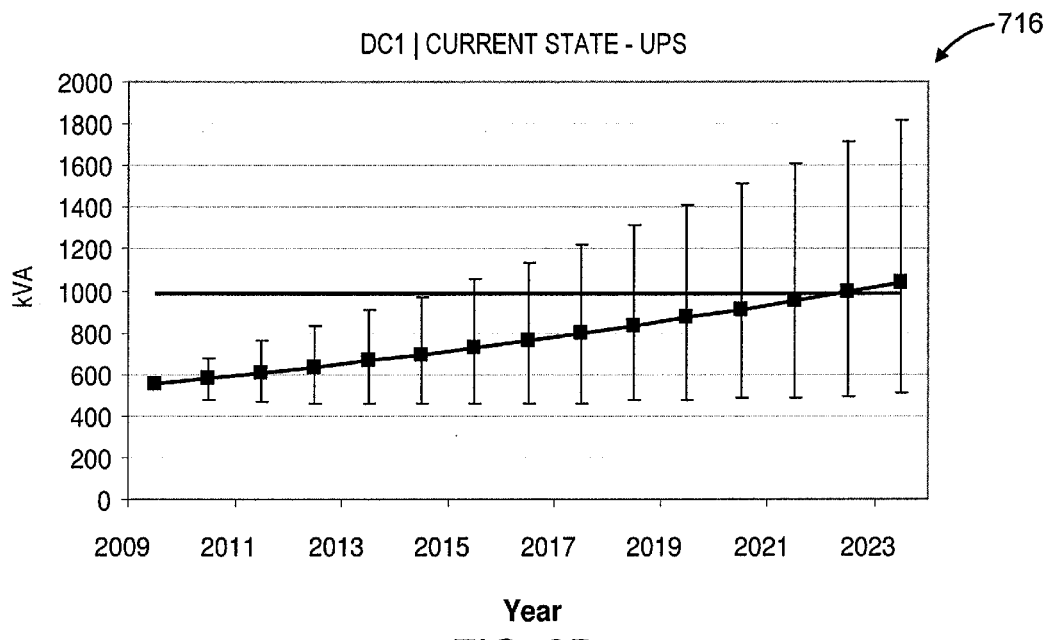
Figure 9C:
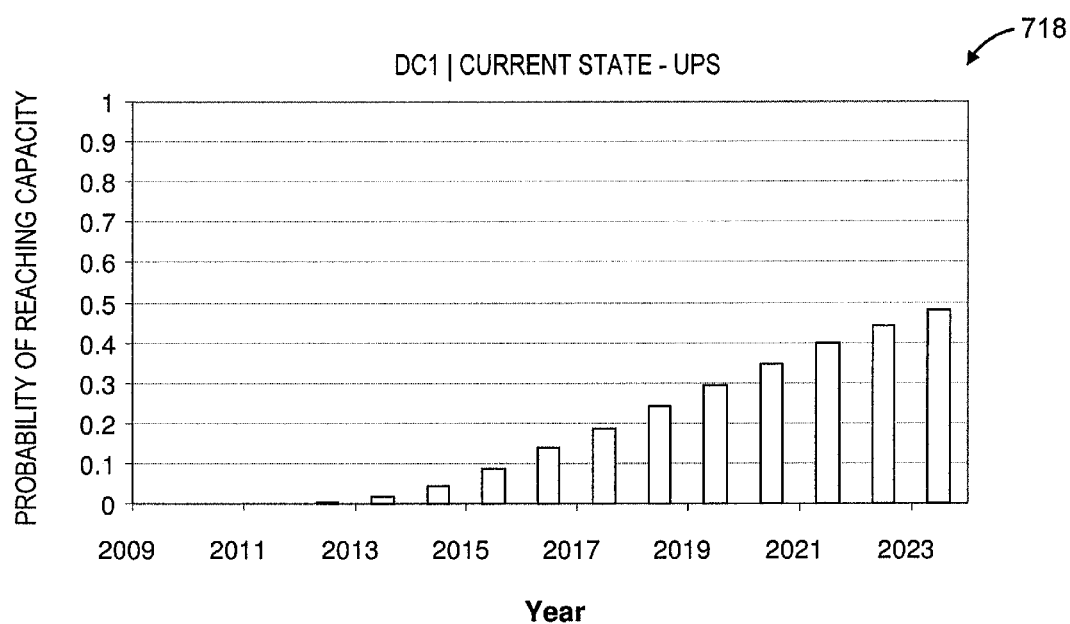

FIG. 9b is an exemplary illustration of predicted usage projection 716 of UPS projection 706 for data center DC1. The depicted horizontal line represents an available capacity of 1,000 kVA. The depicted predicted usage shows upper and lower confidence bounds, set according to confidence level 614, due to inputs of uncertainty 500. Also as shown in FIG. 9b, capacity 218 of UPS 206 of DC1 may reach one hundred percent in mid 2022. FIG. 9c is an exemplary illustration of threshold reaching probability projection 718 of UPS projection 606 for data center DC1. According to FIG. 9c, there is approximately a forty-five percent chance that capacity 218 of UPS 206 of DC1 will reach one hundred percent in mid 2022, based on confidence level 614.

Figure 9D:
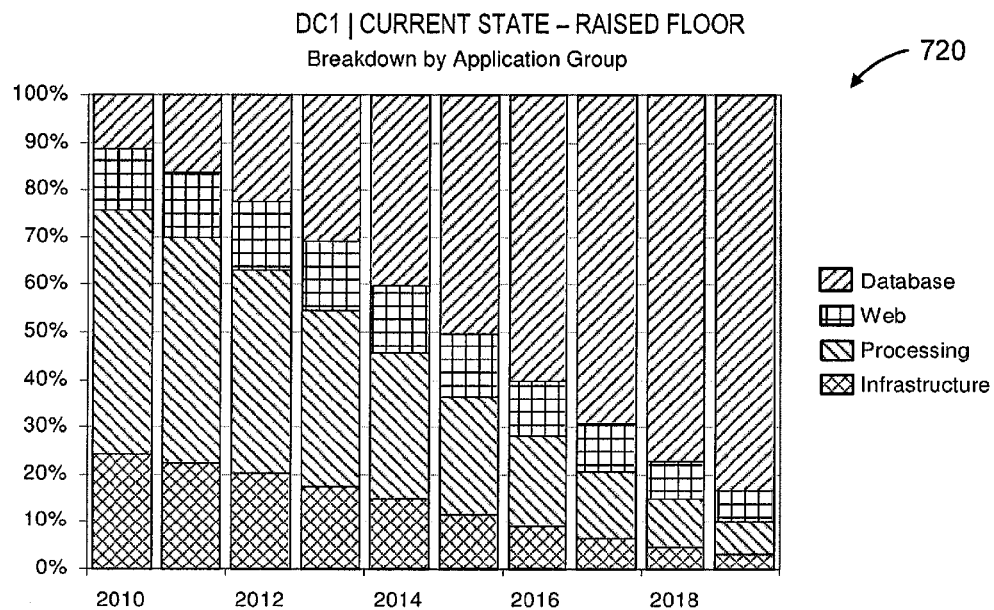
Figure 9E:
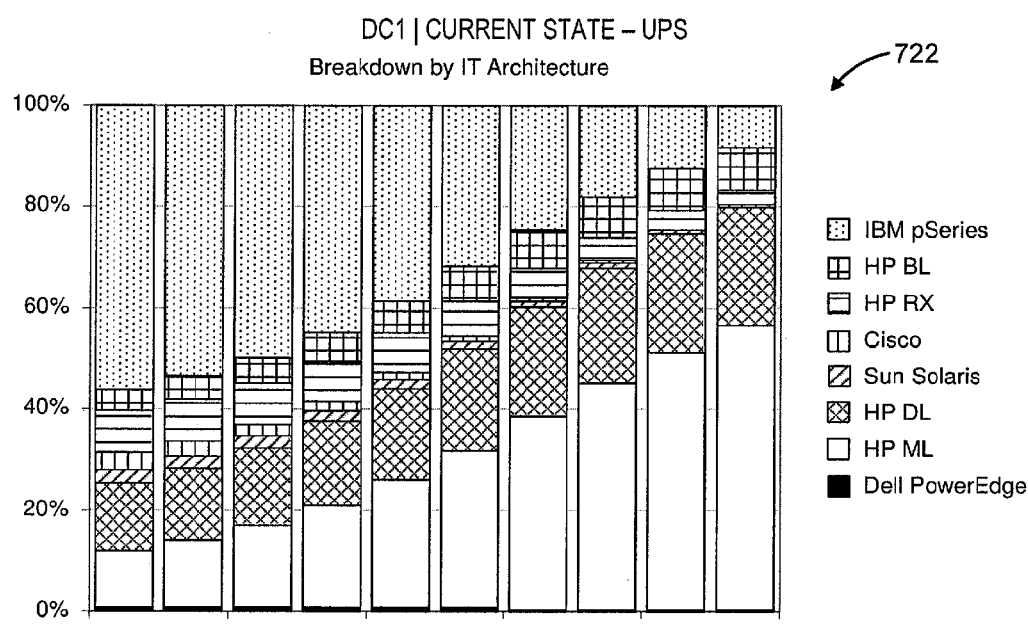

FIG. 9d is an exemplary illustration of predicted usage breakdown 720 of raised floor projection 704. Groups 410 shown are database, web, processing, and infrastructure. As shown, while the web, processing, and infrastructure groups 410 are predicted as consuming less of capacity 218 of raised floor 204 of DC1 from 2010 to 2019, database group 410 is predicted as consuming more of capacity 218 of raised floor 204 of DC1 from 2010 to 2019. FIG. 9e is an exemplary illustration of breakdown 722 of UPS projection 706. FIG. 9e shows that, generally, capacity 218 of UPS 206 is increasingly attributable to units 422 of architecture type 428 of HP BL, HP DL, and HP DL from 2010 to 2019, while decreasingly attributable to units 422 of architecture type 428 of IBM® pSeries, HP RX, Cisco®, Sun Solaris®, and Dell® PowerEdge from 2010 to 2019.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for analyzing one or more physical infrastructure elements of a data center, said method performed by execution of computer-readable program code by at least one processor of at least one computer system, said method comprising:

generating, using at least one of the processors, a plurality of outputs from a stochastic process for a set of inputs to said stochastic process, wherein said stochastic process includes a plurality of evaluations of a deterministic model, said set of inputs comprising one or more inputs of certainty and one or more random variables having a probability distribution, and wherein for an evaluation of said plurality of evaluations of a deterministic model a random number determined from a probability distribution of said one or more random variables having a probability distribution is input into said deterministic model;

performing, using at least one of the processors, a statistical output analysis of said outputs; and utilizing, using at least one of the processors, said statistical output analysis to generate one or more threshold reaching projections for each of said one or more physical infrastructure elements of said data center;

wherein said inputs of certainty comprise one or more groups of IT applications associated with said data center, and wherein said one or more random variables having a probability distribution define one or more growth rates for each of said groups of IT applications.

2. The method of claim 1, wherein said stochastic process is a Monte Carlo simulation.

3. The method of claim 1, wherein each of said physical infrastructure elements has a threshold capacity, and wherein said inputs of certainty comprise said threshold capacity of each of said physical infrastructure elements.

4. The method of claim 1, wherein said inputs of certainty comprise an IT architecture definition comprising one or more units, each unit having an IT architecture type, and wherein said one or more random variables having a probability distribution comprise a technology trend for each IT architecture type;

wherein each technology trend is expressed as an expected value and a corresponding deviation from the expected value.

5. The method of claim 1, wherein said inputs of certainty comprise one or more groups of IT applications associated with said data center, each of said groups having an IT strategy definition, and wherein said inputs of certainty further comprise said IT strategy definition of each of said groups.

6. The method of claim 1, wherein said inputs of certainty comprise one or more application group definitions, each application group definition referencing a group of IT applications associated with said data center and an IT architecture type.

7. The method of claim 6, wherein each of said application group definitions further comprises one or more of a number of units of said IT architecture type associated with said group, a unit reduction factor, a unit refresh period, and a rack density.

8. A computer program product for analyzing one or more physical infrastructure elements of a data center, the computer program product comprising:
a computer readable storage medium having computer readable program code embodied therewith, the computer readable program code comprising:
computer readable program code configured to generate a plurality of outputs from a stochastic process for a set of inputs to said stochastic process, wherein said stochastic process includes a plurality of evaluations of a deterministic model, said set of inputs comprising one or more inputs of certainty and one or more random variables having a probability distribution, and wherein for an evaluation of said plurality of evaluations of a deterministic model a random number determined from a probability distribution of said one or more random variables having a probability distribution is input into said deterministic model;
computer readable program code configured to perform a statistical output analysis of said outputs; and
computer readable program code configured to utilize said statistical output analysis to generate one or more threshold reaching projections for each of said one or more physical infrastructure elements of said data center;
wherein said inputs of certainty comprise one or more groups of IT applications associated with said data center, and wherein said one or more random variables having a probability distribution define one or more growth rates for each of said groups of IT applications.

9. The computer program product of claim 8, wherein said stochastic process is a Monte Carlo simulation.

10. The computer program product of claim 8, wherein each of said physical infrastructure elements has a threshold capacity, and wherein said inputs of certainty comprise said threshold capacity of each of said physical infrastructure elements.

11. The computer program product of claim 8, wherein said inputs of certainty comprise an IT architecture definition comprising one or more units, each unit having an IT architecture type, and wherein said one or more random variables having a probability distribution comprise a technology trend for each IT architecture type;
wherein each technology trend is expressed as an expected value and a corresponding deviation from the expected value.

12. The computer program product of claim 8, wherein said inputs of certainty comprise one or more groups of IT applications associated with said data center, each of said groups having an IT strategy definition, and wherein said inputs of certainty further comprise said IT strategy definition of each of said groups.

13. The computer program product of claim 8, wherein said inputs of certainty comprise one or more application group definitions, each application group definition referencing a group of IT applications associated with said data center and an IT architecture type.

14. The computer program product of claim 13, wherein each of said application group definitions further comprises one or more of a number of units of said IT architecture type associated with said group, a unit reduction factor, a unit refresh period, and a rack density.

15. A system for analyzing one or more physical infrastructure elements of a data center, said system comprising:
a memory for storing a set of inputs to a stochastic process, wherein said stochastic process includes a plurality of evaluations of a deterministic model, said set of inputs comprising one or more inputs of certainty and one or more random variables having a probability distribution, and wherein for an evaluation of said plurality of evaluations of a deterministic model a random number determined from a probability distribution of said one or more random variables having a probability distribution is input into said deterministic model;
a processor configured for:
generating a plurality of outputs from said stochastic process for said set of inputs;
performing a statistical output analysis of said outputs; and
utilizing said statistical output analysis to generate one or more threshold reaching projections for each of said one or more physical infrastructure elements of said data center;
wherein said inputs of certainty comprise one or more groups of IT applications associated with said data center, and wherein said one or more random variables having a probability distribution define one or more growth rates for each of said groups of IT applications.

16. The system of claim 15, wherein the stochastic process is a Monte Carlo simulation.

17. The system of claim 15, wherein each of said physical infrastructure elements has a threshold capacity, and wherein said inputs of certainty comprise said threshold capacity of each of said physical infrastructure elements.

18. The system of claim 15, wherein said inputs of certainty comprise an IT architecture definition comprising one or more units, each unit having an IT architecture type, and wherein said one or more random variables having a probability distribution comprise a technology trend for each IT architecture type;
wherein each technology trend is expressed as an expected value and a corresponding deviation from the expected value.

19. The system of claim 18, wherein said technology trend comprises one or more of a performance improvement trend, a power trend, and a rack density improvement trend.

20. The system of claim 15, wherein said inputs of certainty comprise one or more groups of IT applications associated with said data center, each of said groups having an IT strategy definition, and wherein said inputs of certainty further comprise said IT strategy definition of each of said groups.

21. The system of claim 15, wherein said inputs of certainty comprise one or more application group definitions, each application group definition referencing a group of IT applications associated with said data center and an IT architecture type.

22. The system of claim 21, wherein each of said application group definitions further comprises one or more of a number of units of said IT architecture type associated with said group, a unit reduction factor, a unit refresh period, and a rack density.

* * * * *